(12) United States Patent
Vakrat et al.

(10) Patent No.: US 7,983,503 B2
(45) Date of Patent: Jul. 19, 2011

(54) ADVANCED NOISE REDUCTION IN DIGITAL CAMERAS

(75) Inventors: Dudi Vakrat, Nethanya (IL); Noam Korem, Timrat (IL); Victor Pinto, Zichron-Yaakov (IL)

(73) Assignee: Zoran Corporation, Sunnyvale, CA (US)

( * ) Notice: Subject to any disclaimer, the term of this patent is extended or adjusted under 35 U.S.C. 154(b) by 1079 days.

(21) Appl. No.: 11/754,202

(22) Filed: May 25, 2007

(65) Prior Publication Data

US 2008/0291330 A1 Nov. 27, 2008

(51) Int. Cl.
*H04N 5/00* (2011.01)
(52) U.S. Cl. ........ 382/260; 382/261; 382/262; 348/607; 348/E5.001
(58) Field of Classification Search .................. 382/254, 382/260, 261; 348/607, E5.001
See application file for complete search history.

(56) References Cited

U.S. PATENT DOCUMENTS

| | | | |
|---|---|---|---|
| 5,461,655 A | 10/1995 | Vuylsteke et al. | |
| 5,991,457 A * | 11/1999 | Ito et al. | 382/254 |
| 6,304,608 B1 * | 10/2001 | Chen et al. | 375/252 |
| 6,580,835 B1 | 6/2003 | Gallagher et al. | |
| 6,625,325 B2 | 9/2003 | Gindele et al. | |
| 6,681,054 B1 | 1/2004 | Gindele | |
| 6,718,068 B1 | 4/2004 | Gindele et al. | |
| 6,738,494 B1 | 5/2004 | Savakis et al. | |
| 6,804,393 B2 | 10/2004 | Gindele et al. | |
| 6,807,300 B1 | 10/2004 | Gindele et al. | |
| 6,813,389 B1 | 11/2004 | Gindele et al. | |
| 6,856,704 B1 | 2/2005 | Gallagher et al. | |
| 6,931,160 B2 | 8/2005 | Gindele et al. | |
| 6,937,772 B2 | 8/2005 | Gindele | |
| 6,937,775 B2 | 8/2005 | Gindele et al. | |
| 7,054,501 B1 | 5/2006 | Gindele et al. | |
| 7,065,255 B2 | 6/2006 | Chen et al. | |
| 7,092,579 B2 | 8/2006 | Serrano et al. | |
| 7,116,838 B2 | 10/2006 | Gindele et al. | |
| 7,181,086 B2 * | 2/2007 | Gindele et al. | 382/265 |
| 7,257,271 B2 * | 8/2007 | Adams et al. | 382/275 |
| 2002/0118887 A1 * | 8/2002 | Gindele | 382/260 |
| 2008/0025628 A1 * | 1/2008 | De Haan | 382/255 |

OTHER PUBLICATIONS

Lee, "Digital Image Smoothing and the Sigma Filter," *Computer Visiion, Graphics, and Image Processing*, vol. 24, pp. 255-269 (1983).

* cited by examiner

*Primary Examiner* — Bhavesh M Mehta
*Assistant Examiner* — Stephen R Koziol
(74) *Attorney, Agent, or Firm* — Perkins Coie LLP

(57) ABSTRACT

A noise reduction apparatus is presented that includes groups of one or more serially connected non-linear filter units. Each of the filter unit groups are driven by decimated input image data at a different level of decimation and the output of at least one of these groups serves as one of a plurality of inputs to another group driven at a different decimation level.

23 Claims, 2 Drawing Sheets

ADVANCED NOISE REDUCTION IN DIGITAL CAMERAS

BACKGROUND

This application relates to image processing in digital cameras and other electronic digital image acquisition devices, and particularly to techniques of improving noise reduction techniques for such images.

Images obtained by digital cameras and other imaging systems contain random noise, which typically grows stronger as the ISO sensitivity grows higher. Noise reduction in digital cameras is becoming increasingly important and problematic because of several trends in the digital camera market which result in lower Signal to Noise Ratios (SNR), including the increasing of sensor resolution by reducing the pixel size and the providing better image quality at higher ISO sensitivities, which enables capture of images in low light conditions.

Prior art approaches typically effect noise reduction by either applying edge preserving filters on the image or suppressing chromatic components. Applying edge-preserving filters on the image, such as median filters, bilateral filters and others, are well known in the art. The difficulty encountered with these methods is that the size of the filter required for an effective noise reduction grows in proportion to the amount of noise in the image. However, the size of the filters is usually limited in order to save hardware costs, and software implementations tend to incur too much time and processing power to be practical. Suppressing the chromatic components of the pixels to zero in dark or gray areas reduces the chromatic component of the noise in these areas. The difficulty encountered using this method is that it affects only dark/gray areas, and it is also very likely to suppress real colors in the image. A seminal article on aspects of noise reduction in imagery and using sigma filters for this purpose is given in "Digital Image Smoothing and the Sigma Filter", Lee, J. S., *Computer Vision, Graphics, and Image Processing*, 24, 255-269, 1983.

These various prior art methods tend to have a number of shortcomings when it comes to implementation in digital cameras, video, and other imaging systems. There will always be noise when an image is captured in low light conditions. The noise level will increase as the sensor pixel size is decreased due to sensor resolution issues and due to a trend to reduce sensor cost. Therefore, there is substantial room for improvements in digital imaging systems, even when considering future changes in the application environment.

SUMMARY

The described methods and corresponding apparatus provide ways to achieve superior image quality as compared to previous noise reduction approaches. A noise reduction apparatus is presented that includes groups of one or more serially connected non-linear filter units. Each of the filter unit groups are driven by decimated input image data at a different level of decimation and the output of at least one of these groups serves as one of a plurality of inputs to another group driven at a different decimation level.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes.

To the extent of any inconsistency or conflict in the definition or use of terms between any of the incorporated publications, documents or things and the present application, those of the present application shall prevail.

DETAILED DESCRIPTION OF EXEMPLARY EMBODIMENTS

Overview

In order to achieve the desired results, preferred embodiments described here employ a matrix of small noise reduction filters working on decimated (downscaled) representations of the image being acquired and performing in concert to achieve performance equivalent to a much larger filter. These offer a comprehensive solution, which can be implemented in hardware (HW) in the exemplary embodiments, and which includes decimation along with small size non-linear low pass filters. The results obtained can achieve quality such as that obtained by applying a much larger filter, with only a minor penalty in motion image frame rates or silicon area.

The exemplary embodiments provide a comprehensive solution for digital cameras, video, and imaging systems that provides effective noise reduction in an image acquired using a high gain analog signal path between the imaging system's sensor and its analog to digital (A/D) converter. Images acquired under these conditions are often call "high ISO images". In this imaging environment, the various aspects presented in the following provide results equivalent in quality to those achieved by very large noise reduction filters, without the cost in frame-rate and/or DRAM-bandwidth that is usually incurred when such filters are employed.

A particular advance in the state of the art can be stated as the technique of using an array of filters (of any appropriate type), at various levels of decimation (downscaling to lower resolution), and the use of selective blending of resealed, filtered image data, dependent on the uniformity of the local region of the image being processed.

These techniques provide effective noise removal and higher image quality for high ISO images, with minor costs in required hardware, frame rates and DRAM bandwidth. It allows the use of sensors and/or an analog front end with lower SNR qualities, such as CMOS sensors, or sensors with higher resolution and smaller pixel size. Further, it allows further increase in the ISO sensitivities in camera products, and increases the ability of cameras to capture images in low light conditions.

Exemplary Filter Arrangements

The described techniques are based on successive decimation of the neighborhood of the current pixel, edge preserving (or, more generally, non-linear) filtration of the decimated pixel data, and interpolation and blending of the various decimated image data to achieve superior noise reduction without incurring excessive cost in terms of hardware, processing power or time. The implementation described here is based on a hardware solution; however, it will be clear to one skilled in the art that the same concepts can be implemented in software, firmware, or a combination of these running on an appropriate signal processor, with associated memory and peripheral hardware.

Figure 1:
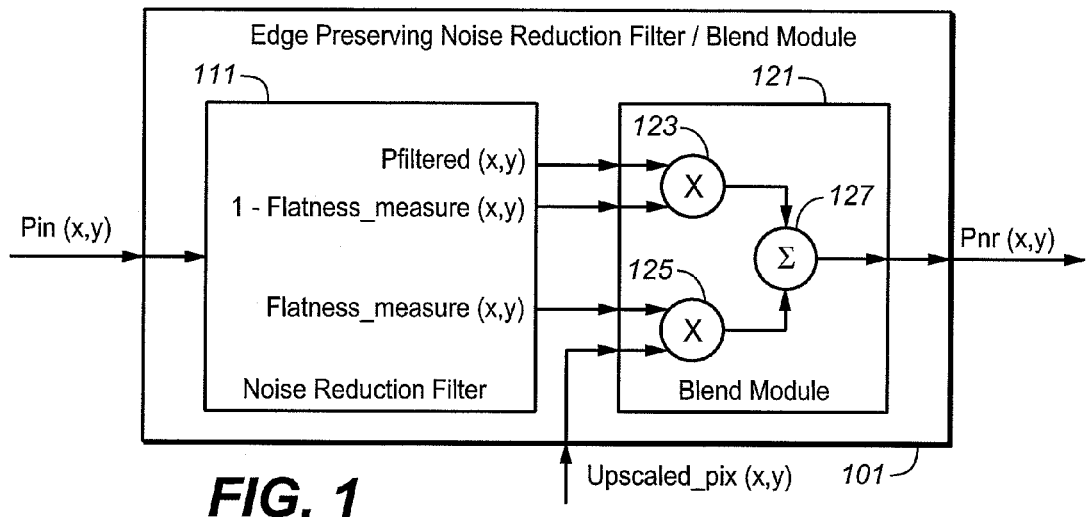
FIG. 1 illustrates an example of an edge preserving noise reduction filter building block.

A basic component of the described noise reduction system is the Edge Preserving Noise Reduction Filter/Blend building block 101. FIG. 1 is a block diagram of this component. It consists of two elements: The Noise Reduction Filter 111, and a Blend Module 121. The Noise Reduction Filter III selectively removes noise from the image while preserving, as much as possible, the edge detail in the image. Additionally, the filter creates a metric, called "flatness_measure(x,y)", which is a measure of the relative amount of uniformity in the current region of the image. In response to this measure, the Blend Module 121 melds (at 127) the current noise filtered pixel with image data impressed on its secondary input (at the bottom of the module, labeled supscaled_pix(x,y)'). The exemplary embodiment forms a linear combination weighted (at 123 and 125) by the "flatness_measure(x,y)". The operation of an exemplary Noise Reduction Filter is described in greater detail later in this discussion. Those skilled in the art will recognize that any Noise Reduction Filter III that preserves edges and also provides a suitable metric of local image uniformity may be used in place of the filter described herein.

At each pixel location in the image, the current pixel is cleansed of noise by examination and processing of the current region's pixel data (neighborhood). The neighborhood is defined in the exemplary embodiments as the pixels in an N×N square of data surrounding the current pixel, where N is a small odd integer (five, for example).

The enhanced noise reduction operation of the system is achieved by configuring an array of the filter kernels, using decimation (downscaling), filtering, interpolation (upscaling) of the filtered pixel data and blending the upscaled data with higher resolution data. Several configurations are possible, with some examples described with respect to FIGS. 2-4.

Figure 2:
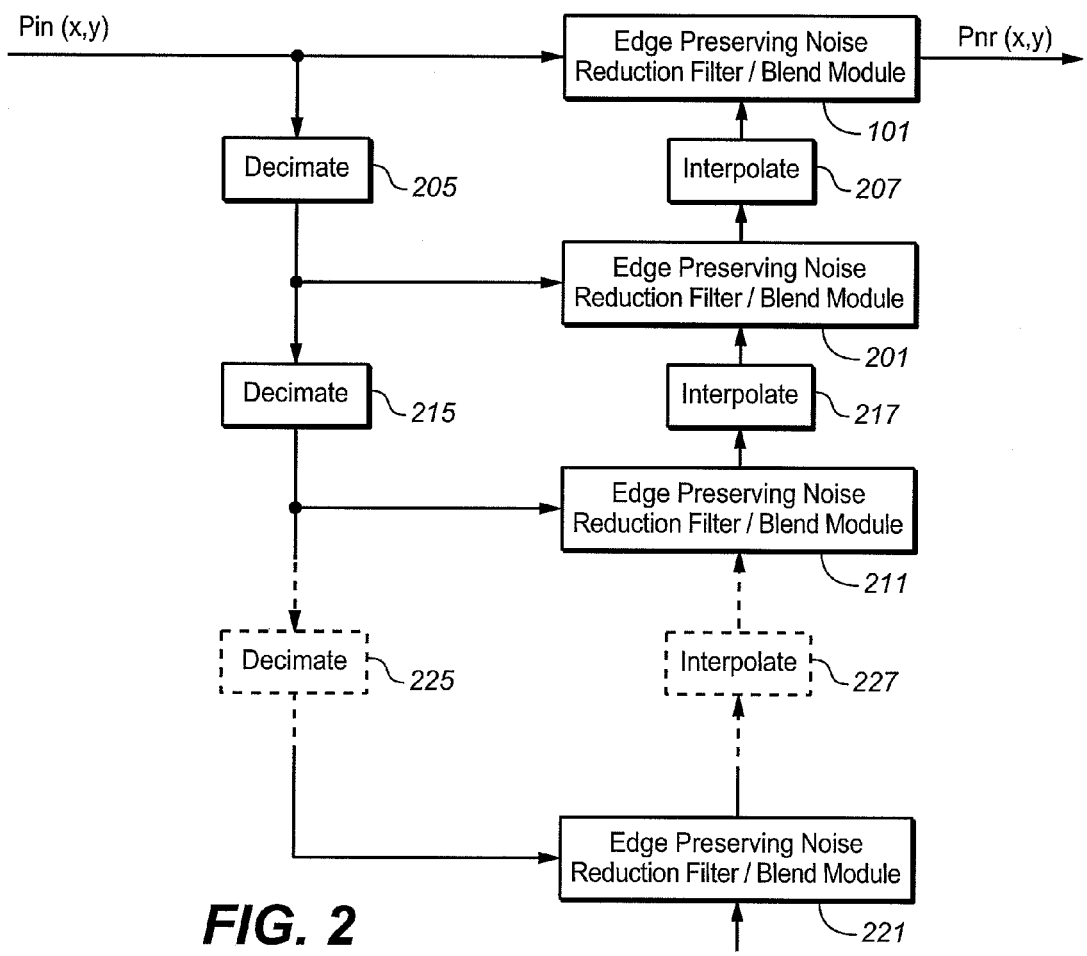
FIG. 2 is a block diagram of one configuration ("increasing depth" mode) of filter kernels.

FIG. 2 details one such configuration, dubbed "Increasing Depth" mode here. In this mode, the full scale pixel data is decimated to several lower levels of resolutions (at 205, 215, 225), and at each level the decimated data is filtered and then selectively blended (at 201, 211, 221) with interpolated (upscaled at 207, 217, 227) data from the immediately lower resolution, depending on the degree of edge activity detected at each resolution. Any number of resolution levels can be used as indicated by the dotted line extensions. The number of resolution levels will be limited only by the selection of N, the size of the neighborhood, as this determines the number of times the input can be downscaled. (Additional detail on upscaling and downscaling can found, for example, in U.S. Pat. No. 6,937,772, which uses them in a differing filtering arrangement.) The amount of upscaling at a given level's interpolation will typically be the same as the amount of downscaling at that level's decimation.

Figure 3:
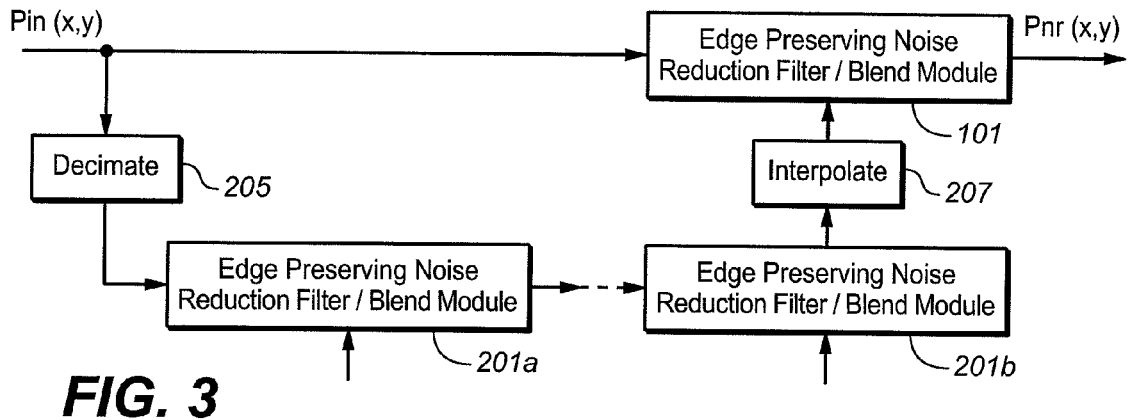
FIG. 3 is a block diagram of a second configuration ("increasing width" mode) of filter kernels.

FIG. 3 details another possible configuration, dubbed "Increasing Width" mode here. In this mode, no blending is performed along the bottom row, with only the Noise Reduction Filter portion of the modules being used. The width mode may have any number of instances of the filter kernels in series, as indicated by the dotted line extensions. FIG. 3 shows two such kernels, 201a and 201b, where any additional kernels would be placed in between. The first of these, 201a, receives the input decimated at 205 and the last (or, here second) kernel 201b then has its input upscaled at 207 to serve as the second input of the top layer filter/blend module 101. Because the Noise Reduction Filters are edge preserving, repeated applications of the same filter on the same data set will provide more and more refined estimates of the noise free value of the current pixel. Note that as the edge preserving filter stages are non-linear, using multiple such filters serially will act differently than just a single such stage with more aggressive filtering. In "Width" mode processing, the upscaled_pix(x,y) input to the Filter/Blend module is unused and unconnected.

Figure 4:
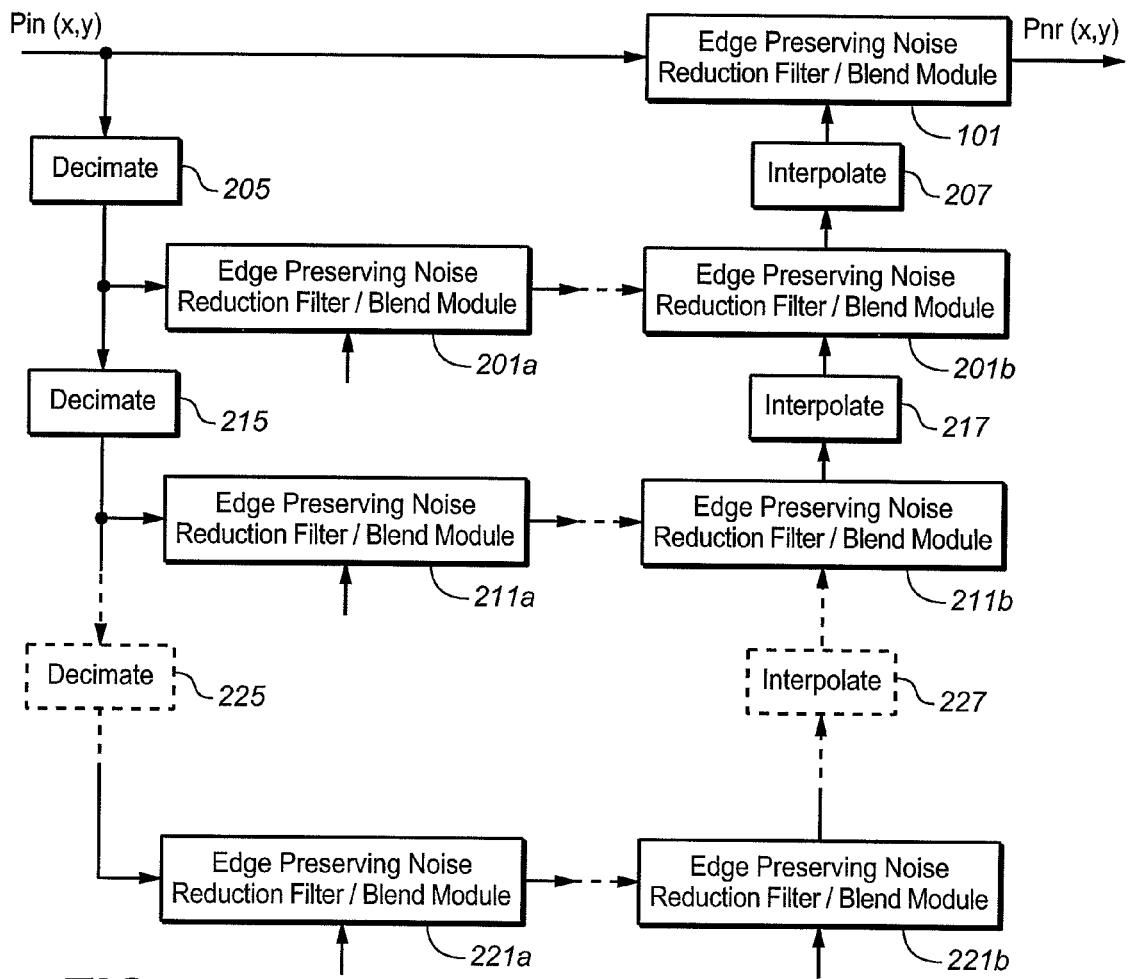
FIG. 4 shows a generalized filter array combining the width and depth modes.

More generally, the system can use both "Width" and "Depth" modes simultaneously, as diagrammed in FIG. 4. This functionally connects the filter elements as an array with a depth of several rows, where each row after the first uses the "width" mode arrangement. (In FIG. 4, as well in the other figures, the arrangement of elements is schematic to show the functional relationships among the various elements, whether these are implemented in software or hardware. Thus, even in a hardware implementation, the various elements need not be physically arranged as shown.) In this generalized architecture, several levels of decimation are provided, which, at each level, are subjected to Noise Reduction filters without Blending ("Width" mode processing), after which upscaled versions of the resulting image data are blended with the immediately higher resolution image data ("Depth" mode processing). In this arrangement, each level has multiple filter elements (201i, 211i, 221i) connected in series, where the first of the series receives in input decimated (at 205, 215, 225) with respect to the level above, and supplies the output of the last of the series (interpolated at 207, 217, 227) to the last of the series in the level above. This matrix of filters is limited only by the size of the neighborhood considered, and the processing power and time available. Although the exemplary embodiment shows the same number of elements in each row after the first single filter row, more generally this need not be the case.

Consequently, it can be seen that the noise reduction filter will have groups of one or more non-linear filter modules connected serially, with each of these groups driven by the input image data decimated to a different level of downscaling. The outputs, for at least one of the groups, will then serve as one of the inputs to another of the groups at a different decimation level.

Filter/Blend Module Operation

For each Input Image pixel in x,y coordinates, Pin(x,y), an exemplary embodiment of the Edge Preserving Noise Reduction Filter/Blend Module performs a series of operations. The first of these is using input image pixels in an N×N environment around Pin(x,y) to perform edge preserving low pass filtering. The result is Pin_filtered(x,y). N is typically a small integer number. The pseudo-code description below gives the operation of an exemplary filter.

Also using the input image in an N×N environment around Pin(x,y), the uniformity metric which indicates the flatness of the environment around Pin(x,y) is calculated. The result is Flatness_measure(x,y). N is typically a small odd integer number (five, for example).

In the instance that the Filter/Blend module also receives an up-scaled decimated image ("Depth" mode operation), the module blends Pin_filtered(x,y) with the equivalent pixel from the Up-scaled Decimated Image, Upscaled_pix(x,y), according to the uniformity metric, Flatness_measure(x,y), to get the Output Image pixel, Pout(x,y):

$$Pout(x,y) = Flatness\_measure(x,y) * Upscaled\_pix(x,y) + (1-Flatness\_measure(x,y)) * Pin\_filtered(x,y)$$

Flatness_measure(x,y) is a value within the range of [0,1]. Around edges it tends toward 0, resulting in milder filtering.

In flat areas of the Input Image, it is pushed towards higher values closer to 1, resulting in more aggressive filtering.

When the imaging system also incorporates dynamic range compensation, such as described, for example, in U.S. patent application Ser. No. 11/752,797, the resultant gain factors for the pixels of the image data may also be taken into account during the noise reduction process. Such a combined approach, and its advantages, are described in a U.S. patent application entitled "Dynamic Range Compensation-Dependent Noise Reduction" by Dudi Vakrat, filed concurrently with the present application, whose teachings can be advantageously combined with the noise reduction techniques described here.

An Exemplary Edge Preserving Noise Reduction Filter Module

This section presents a pseudo-code description of the operation of an exemplary non-linear filter module. The filter described is of the class of sigma filters (see, for example, "Digital Image Smoothing and the Sigma Filter", Lee, J. S., *Computer Vision, Graphics, and Image Processing* 24, 255-269, 1983); however, those skilled in the art will recognize that any noise reducing filter that also provides an estimate of the local region's spatial uniformity may be used for this function.

In this description, the constant "T" is a threshold that indicates the noise levels of the camera's sensor and changes according to the ISO sensitivity for each possible shutter setting. For a given camera and a given ISO setting, the camera manufacturer can calculate T by, for example, capturing a color chart and then determining the maximum value of abs(Pin[x,y]−Pin[x+n,y+m]) over all the flat areas in the image (areas without edges or transitions).

In order to execute an N×N filter (where N is an odd integer) on each input image pixel in the stream Pin(x,y), an exemplary embodiment performs the following:

```
{
    Sum = 0
    Count = 0
    for (m= -(N-1)/2; m<= (N-1)/2;m++)
    {
        for (n= -(N-1)/2; n<= (N-1);n++)
        {
            if (abs(Pin(x,y) - Pin(x+n,y+m)) < T)
            {
                Sum = Sum + Pin(x+n,y+m)
                Count = Count + 1
            }
        }
    }
    If (filtering is performed)
        Pin_filtered(x,y) = Sum/Count
    Else
        Pin_filtered(x,y) = Pin(x,y)
    Flatness_measure(x,y) = Count/(N²)
}
```

Although not shown in the above, the algorithm may also incorporate gain factors from a dynamic range compensation process on a pixel by pixel basis, as described in the U.S. patent application entitled "Dynamic Range Compensation-Dependent Noise Reduction" by Dudi Vakrat, filed concurrently with the present application, as noted above.

Implementation

In one preferred embodiment of the invention, the matrix of filter/blend operations is achieved by successive iterations of a single Edge Preserving Noise Reduction Filter/Blend Module described above with respect to FIG. 1. In order to implement the generalized filter array described in FIG. 4 above, the system could proceed with the following sequence of actions:

1. Decimate the full-scale image successively to the depth of resolution desired, storing each decimated image individually.
2. Beginning at the lowest resolution, apply the Noise Reduction Filter successively, without the blending function ("Width" mode processing), to the desired number of iterations.
3. Upscale the current resolution to the next higher level and store it.
4. At the next higher resolution, apply the Noise Reduction Filter successively, without the blending function, to the desired number of iterations.
5. Blend the resulting image with the upscaled image from the next lower resolution level.
6. Repeat steps 3, 4, and 5 until a full-scale image is achieved.

CONCLUSION

Although the various aspects of the present invention have been described with respect to exemplary embodiments thereof, it will be understood that the present invention is entitled to protection within the full scope of the appended claims.

It is claimed:

1. An image noise reduction apparatus comprising:
   a processor;
   a plurality of filter unit groups, each of said plurality of filter unit groups including a plurality of serially connected non-linear filter units, each of said plurality of non-linear filter units configured to independently suppress noise in image data; wherein each of said plurality of filter unit groups is driven by downscaled input image data at a different level of downscaling; and wherein an output of a first group of said plurality of filter unit groups serves as one of a plurality of inputs to a second group driven at a different downscaling level, wherein the output of the first group is upscaled to a resolution that matches the downscaling level of the second group prior to being fed as an input to the second group, wherein the filter units are edge preserving filters.

2. The noise reduction apparatus of claim 1, wherein the filter units are implemented in hardware.

3. The noise reduction apparatus of claim 1, wherein the filter units are implemented in software.

4. The noise reduction apparatus of claim 1, wherein the filter units are sigma class filters.

5. The noise reduction apparatus of claim 1, wherein each of said filter units uses the same filtering algorithm.

6. The noise reduction apparatus of claim 1, wherein the input image data is image data from a digital camera.

7. The noise reduction apparatus of claim 1, wherein the input image data is image data from a video camera.

8. The noise reduction apparatus of claim 1, further comprising:
   a first non-linear filter element to receive said input image data, filter the input image data, and determine an indication of uniformity of the filtered image data; and
   a blend module to receive the filtered image data from the first non-linear filter element, the indication of uniformity, and an interpolated output of one of said groups and form a combination of the filtered image data from the first non-linear filter element and the interpolated output of said one of said groups, wherein the combination is responsive to the indication of uniformity.

9. The noise reduction apparatus of claim 8, wherein the combination is a linear combination.

10. The noise reduction apparatus of claim 8, wherein the indication of uniformity of the image data around a pixel is determined for an N by N neighborhood of the pixel, where N is an odd integer.

11. The noise reduction apparatus of claim 1, wherein said another group driven at a different downscaling level further includes a blend module that forms a combination of the output of the last of the serially connected filter units therein and an interpolated version of said output of at least one of said groups.

12. A method of performing a noise reduction operation on input image data, comprising:
   downscaling, by a processor, the input image data to a plurality of different levels of downscaling;
   for each level of downscaling, filtering the downscaled image data by a plurality of serially connected non-linear filter units, each of said plurality of non-linear filter units configured to independently suppress noise in image data; and
   providing an output of a first plurality of filter units as one of a plurality of inputs to a second plurality of filter units at a different downscaling level, wherein the output of the first plurality of filter units is upscaled to a resolution that matches the downscaling level of the second plurality of filter units prior to being fed as an input to the second group, wherein the filter units are edge preserving filters.

13. The method of claim 12, wherein the filter units are implemented in hardware.

14. The method of claim 12, wherein the filter units are implemented in software.

15. The method of claim 12, wherein the filter units are sigma class filters.

16. The method of claim 12, wherein each of said filter units uses the same filtering algorithm.

17. The method of claim 12, wherein the input image data is image data from a digital camera.

18. The method of claim 12, wherein the input image data is image data from a video camera.

19. The method of claim 12, further comprising:
   filtering the input data image with a first non-linear filter element;
   determining an indication of uniformity of the filtered image data; and
   forming a combination of the filtered image data from the first non-linear filter element and the interpolated output of said one of said groups, wherein the combination is responsive to the indication of uniformity.

20. The method of claim 19, wherein the combination is a linear combination.

21. The method of claim 19, wherein the indication of uniformity of the image data around a pixel is determined for an N by N neighborhood of the pixel, where N is an odd integer.

22. The method of claim 12, further comprising:
   interpolating said output of at least one of said groups; and
   forming a combination of the output of the last of the serially connected filter units of said another of the groups at a different level and the interpolated output of at least one of said groups.

23. Then noise reduction apparatus of claim 1, wherein the first of said filter unit groups are driven by original image data.

* * * * *